Aug. 29, 1961   M. D. BURROWS ET AL   2,997,890
AGRICULTURAL AND GARDENING IMPLEMENT
Filed July 25, 1957   3 Sheets-Sheet 1
FIG_1
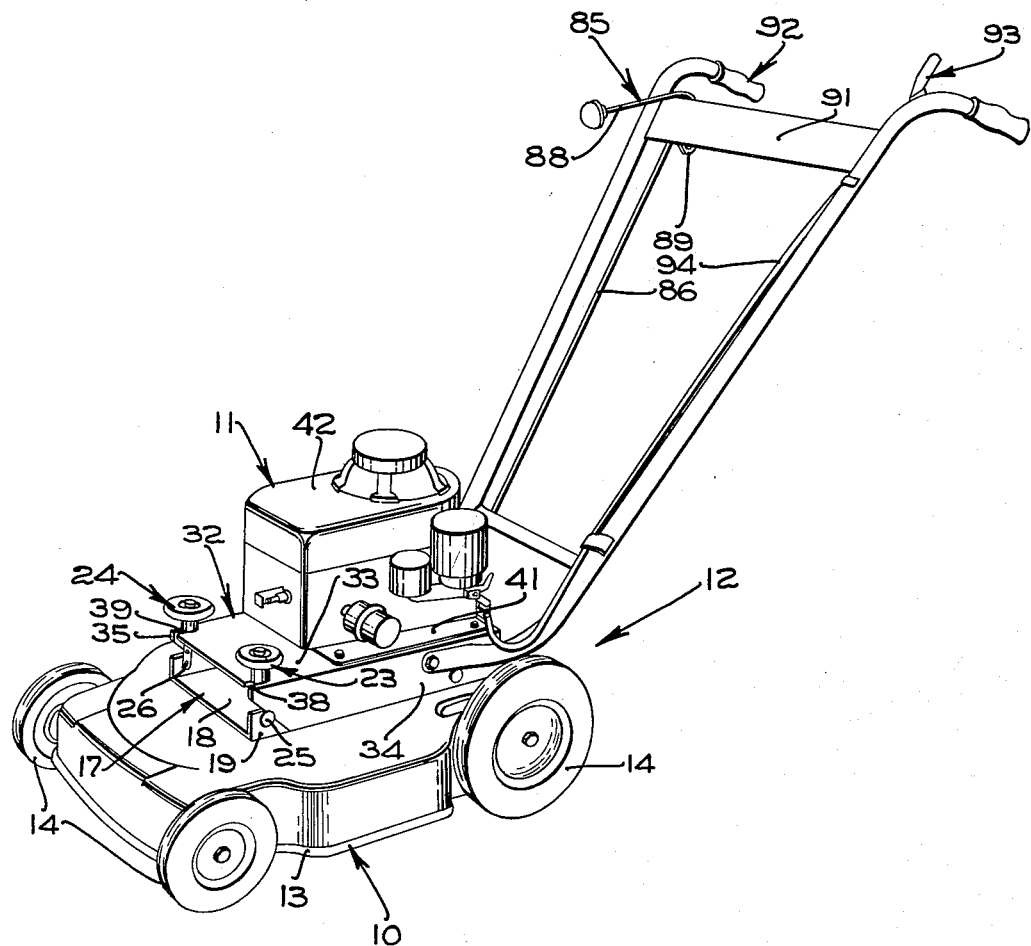
INVENTORS
MILFORD D. BURROWS
WALTER F. FIEBER
BY Hans G. Hoffmeister.
ATTORNEY

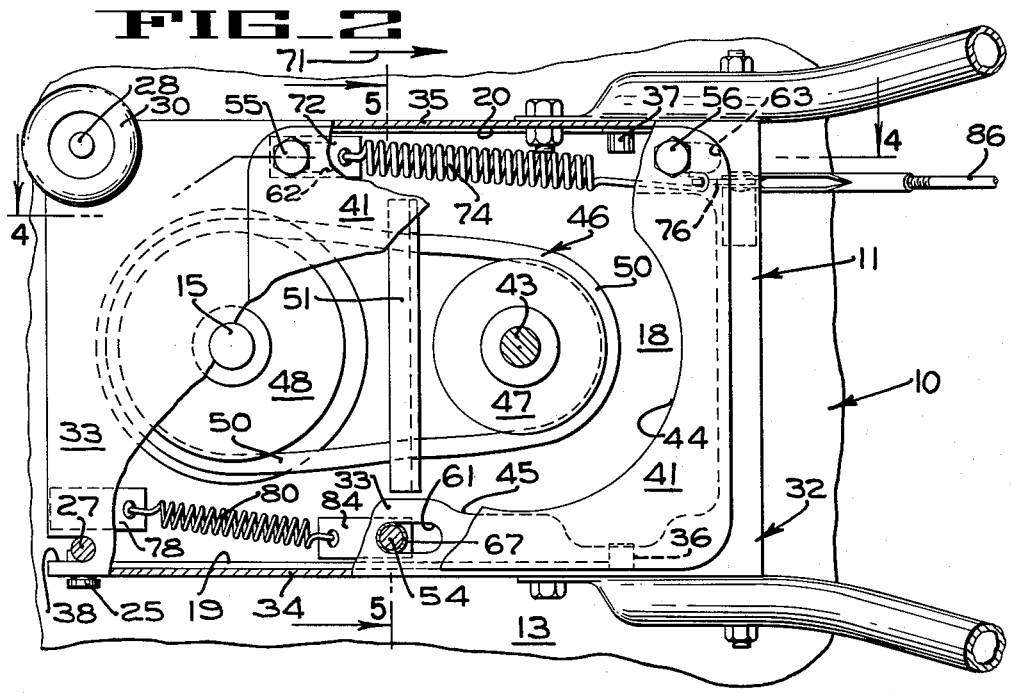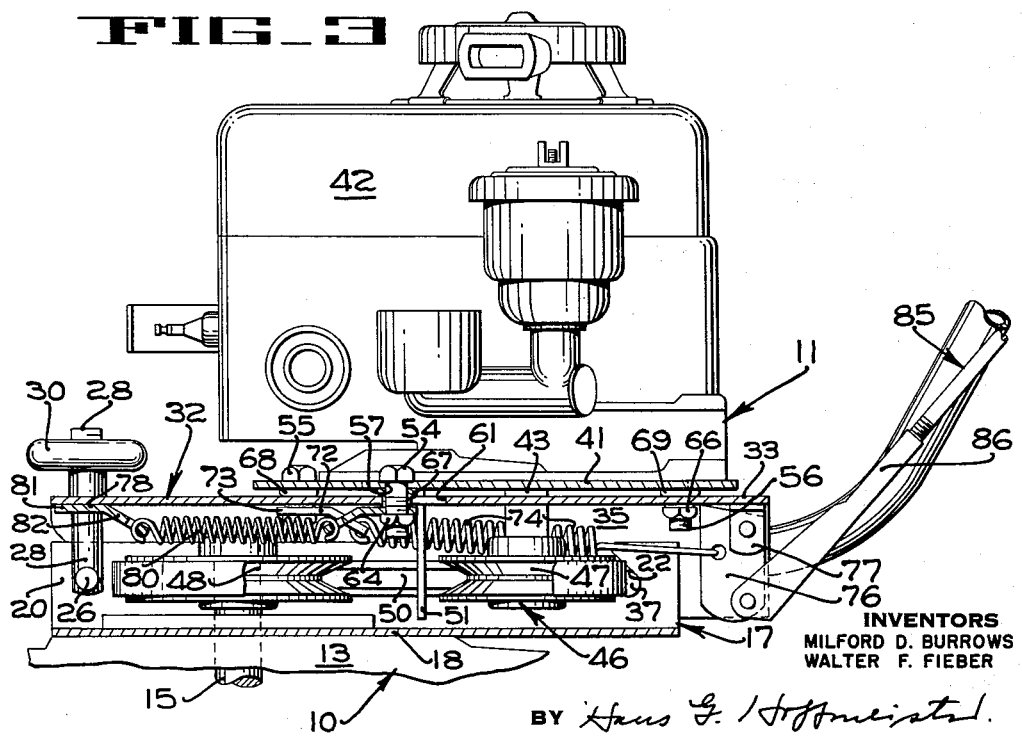

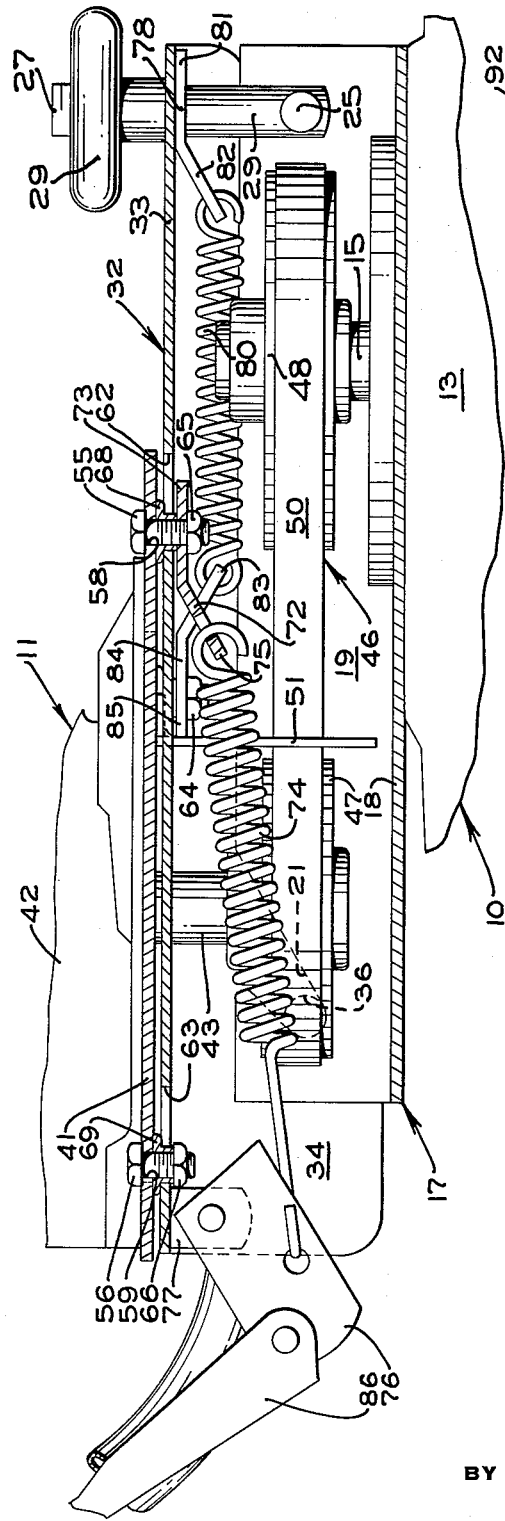

United States Patent Office 2,997,890
Patented Aug. 29, 1961

2,997,890
AGRICULTURAL AND GARDENING IMPLEMENT
Milford D. Burrows, Syracuse, N.Y., and Walter F. Fieber, Saukville, Wis., assignors to Food Machinery and Chemical Corporation, San Jose, Calif., a corporation of Delaware
Filed July 25, 1957, Ser. No. 674,213
10 Claims. (Cl. 74—242.13)

The present invention appertains to power driven agricultural and gardening implements, and more particularly to a belt-tensioning arrangement for the drive assembly of a power driven gardening implement.

Power units capable of use with gardening attachment units, such as mowers and tillers, generally include a vertical drive shaft connected to an engine and a drive pulley secured to the lower end of the drive shaft. The attachment units generally include a vertical drive shaft operative for imparting movement to mower blades or tines and include a driven pulley secured to the upper end of the attachment unit drive shaft. A horizontal drive belt is trained around the drive and driven pulleys. For optionally driving or stopping the driven pulley of the attachment unit, an idler pulley is moved into or out of belt-tensioning position by a clutch assembly.

An object of the present invention is to provide an improved belt-tensioning arrangement for the drive assembly of a gardening implement that eliminates the use of an idler pulley.

Another object is to provide a power driven gardening implement having a simplified belt-tensioning arrangement.

These and other objects and advantages of the present invention will become apparent from the following description taken in conjunction with the accompanying drawings, in which:

FIG. 1 is a perspective of a power unit of the present invention mounted on a rotary mower attachment.

FIG. 2 is a fragmentary plan view of the power unit with a portion broken away to illustrate the belt-tensioning arrangement with parts thereof shown in a belt-slackening position.

FIG. 3 is a fragmentary side elevation of the power unit with a portion broken away to illustrate the drive assembly and the belt-tensioning arrangement.

FIG. 4 is an enlarged vertical section with parts broken away taken along line 4—4 of FIG. 2 and with components of the belt-tensioning arrangement shown in a belt-tightening position.

FIG. 5 is a vertical section taken along line 5—5 of FIG. 2.

FIG. 6 is a side elevation of a control lever assembly for the belt-tensioning arrangement.

In FIG. 1 is illustrated a rotary mower attachment 10 assembled with a detachable power unit 11 to form a rotary lawn mower 12. The rotary mover attachment 10 includes a mower housing 13 having four wheels 14 rotatably mounted on all four corners thereof. A bearing housing, not shown, is mounted within the housing 13 and is adapted to receive an attachment driven shaft 15 (FIG. 3). A rotary cutter blade, not shown, is secured to the lower end of the shaft 15 for rotation therewith.

Mounted on the housing 13 is a channel-shaped attachment frame 17 (FIG. 1) which includes a base 18 and side plates 19 and 20. At the rearward portions of the side plates 19 and 20 are formed inclined slots 21 and 22 (FIGS. 3 and 4), respectively. The forward portions of the side plates 19 and 20 (FIG. 1) are provided with a pair of latches 23 and 24, respectively. The latches 23 and 24 (FIGS. 1 and 3) include transversely spaced shoulder pins 25 and 26, which are pivotally mounted on the forward ends of the side plates 19 and 20, respectively. The pins 25 and 26 are secured at their inner ends to threaded studs 27 and 28, respectively, which studs have hand wheels 29 and 30 mounted thereon, respectively, in threaded engagement therewith.

The detachable power unit 11 (FIG. 1) comprises a channel-shaped frame 32 having a base plate 33 and depending side plates 34 and 35. For detachably assembling the power unit 11 to the mower attachment 10, the side plates 34 and 35 are provided, adjacent their rearward ends, with inwardly extending studs 36 and 37 (FIG. 2), respectively, that are received by the slots 21 and 22, respectively, of the attachment frame 17. At the forward edge of the base plate 33 are formed a pair of transversely spaced, longitudinally disposed slots 38 and 39 (FIGS. 1 and 2) which receive the studs 27 and 28, respectively, when the hand wheels 29 and 30 are pivoted into engagement with the upper surface of the plate 33. The forward edges of the side plates 34 and 35 are beveled (FIG. 1) and engage in guided relation the pins 25 and 26, respectively, of the attachment frame 17.

Included in the power unit 11 is a rigid engine support plate 41 (FIGS. 1, 3 and 4) that is disposed above the base plate 33 of the frame 32. The support plate 41 has an engine 42 (FIG. 3) mounted securely thereon, which engine may be of any conventional type that is suitatble for use with garden implements, such as a mower and tiller. Extending vertically downward from the engine 42 is a drive shaft 43 (FIG. 3) which is received by suitable openings 44 and 45 (FIG. 2) in the plates 41 and 33, respectively.

The drive shaft 43 is connected to a drive assembly 46 (FIGS. 2 and 3), which is disposed below the base plate 33 of the power unit frame 32. The drive assembly 46 comprises a drive sheave 47, which is connected to the lower end of the engine drive shaft 43, and a driven sheave 48, which is connected to the upper end of the attachment drive shaft 15. A V-belt 50 is trained around the sheaves 47 and 48. Depending from the engine support plate 41 intermediate the sheaves 47 and 48 and extending through the opening 45 of the base plate 33 is a belt guide 51 (FIGS. 4 and 5). The belt guide 51 comprises depending legs 52 and 53 (FIG. 5), which are arranged so that the runs of horizontal belt 50 pass therebetween.

To alternately tighten and slacken the V-belt 50 for selectively driving the shaft 15 of the mower attachment unit 10, the engine support plate 41, which has the engine 42 secured thereto, is adapted for limited movement in a longitudinal direction relative to the base plate 33 of the power unit frame 32. For this purpose, bolts 54, 55 and 56 (FIGS. 2, 3 and 4) are received by apertures 57, 58 and 59, respectively, of the engine support plate 41 and by longitudinal slots 61, 62 and 63, respectively, of the base plate 33. Suitable nuts 64, 65 and 66 are in threaded engagement with the bolts 54, 55 and 56 below the base plate 33, and shouldered bushings 67, 68 and 69 (FIG. 3), which are received in the slots 61, 62 and 63 and have their shoulders disposed between the plates 33 and 41, receive the bolts 54, 55 and 56, respectively.

Thus, the engine support plate 41 and engine 42 have limited longitudinal movement relative to the attachment frame 17 and power unit frame 32. The extent of this longitudinal movement is determined by the size of slots 61, 62 and 63 of the base plate 32. By moving the engine support plate 41 in the direction shown by arrow 71 (FIG. 2) until the bushings 67, 68 and 69 engage a portion of the walls surrounding slots 61, 62 and 63, respectively, the engine drive shaft 43 is shifted sufficiently to tension the belt 50 for driving the mower attachment 10. Shifting the engine support plate 41 in an opposite direction until further movement of the bushings 67, 68 and 69 is arrested by a portion of the walls surrounding the slots 61, 62 and 63, respectively, moves the engine drive shaft 43 sufficiently to slacken the belt 50, thereby stopping the rotation of the driven shaft 15 of the mower attachment 10.

For shifting the engine support plate 41 to a belt-tensioning position, a spring anchor plate 72 (FIGS. 2 and 3), adjacent side plate 35, has an apertured horizontal portion 73 that is in fixed relation with the bolt 55. One end of an extension spring 74 is fastened to an apertured sloping portion 75 of the plate 72. The spring 74 extends generally in a longitudinal direction toward the rearward portion of the mower unit 13 and has the other end thereof secured to a pivot plate 76 intermediate its ends. The plate 76 is pivotally supported at one end thereof to a bracket 77, which is fixed to the lower surface of the base plate 33 at the rearward portion thereof and adjacent the side plate 35. Hence, pivoting the plate 76 in a counterclockwise direction (as viewed in FIG. 3) tensions the spring 74 to cause the bolt 55 to move the engine support plate 41 in the direction shown by arrow 71 (FIG. 2).

To shift the engine support plate 41 to a belt-slackening position, thereby stopping the rotation of the shaft 15 of the mower attachment 10, a horizontal portion 81 of a spring support bracket 78 (FIGS. 2, 3 and 4) is secured to the forward end of the base plate 33 on the lower surface thereof adjacent side plate 34. One end of an extension spring 80 is secured to an apertured sloping portion 82 of the bracket 78. The spring 80 exteds generally in a longitudinal direction toward the forward portion of the mower unit 13 and has the other end thereof secured to an apertured sloping portion 83 of a spring anchor plate 84. A horizontal apertured portion 85 of the spring anchor plate 84, which is adjacent the side plate 34, is in fixed relation with the bolt 54. When the plate 76 is pivoted in a counterclockwise direction (as viewed in FIG. 3), the spring 74 is tensioned to cause the engine support plate 41 to move in the direction shown by arrow 71 (FIG. 2). This movement of the engine support plate 41 tensions the extension spring 80 through the connection of bolt 54. When the plate 76 is pivoted in a clockwise direction, thus releasing the tension on spring 74, the engine support plate 41 is moved in a direction opposite of that shown by arrow 71 (FIG. 2) under the action of spring 80 through the bolt 54.

A control linkage 85 (FIGS. 1, 3 and 6) controls the pivoting of the plate 76 and comprises a control rod 86 secured at its lower end to the end of the plate 76 opposite its pivot support. The upper end of the control rod 86 is pivotally connected to a clamp 87 (FIG. 6) that is carried by a control lever 88 for movement therewith. The lever 88 is pivotally mounted on a bracket 89 that is fixed to an upper cross member 91 of a steering handle bar assembly 92 (FIG. 1). The handle bar assembly 92 is fixed to the side plates 34 and 35 of the power unit frame 32 and carries a throttle assembly 93 (FIG. 1) which is connected to the engine 42 by a suitable cable 94 to control the speed and operation of the engine 42.

In the operation of the rotary mower unit 13, the V-belt 50 is positioned between and in engagement with the depending legs of the belt guide 51 and is trained around the drive sheave 47. The power unit 11 is placed upon the mower attachment unit 10 with the V-belt 50 trained around the driven sheave 48. The spacing between the legs 52 and 53 is coordinated with the size of the sheaves 47 and 48 so as to maintain the runs of the drive belt 50 sufficiently close to one another to retain the drive belt in engagement with the driven sheave 48 when the belt is disengaged by the driven sheave 47. In mounting the power unit 11 on the attachment unit 10, the studs 36 and 37 of the power unit frame 32 are positioned into the inclined slots 21 and 22, respectively, of the attachment frame 17, while the forward end of the power unit 11 is inclined upwardly. The forward end is lowered until the beveled edges of side plates 34 and 35 rest on pivot pins 25 and 26, respectively. The studs 27 and 28 are pivoted into latch slots 38 and 39, and the hand wheels 29 and 30 are lowered into firm engagement with the base plate 33.

The engine 42 is started in a conventional manner. To tension the belt 50 for driving the mower attachment unit 10, the control lever 88 is shifted into the position shown by broken line in FIG. 6. This shifting of the control lever 88 raises the control rod 86, which pivots the plate 76 outwardly and upwardly (FIG. 4). As a result of this pivotal movement, the engine support plate 41 shifts in the direction shown by arrow 71 (FIG. 2) through the action of extension spring 74 and bolt 55. The shifting of the engine support plate 41 imparts a corresponding movement to the engine 42, the drive shaft 43 and drive sheave 47 to tension belt 50, whereby the driven sheave 48 and the attachment drive shaft 15 are rotated. When the belt 50 is under tension the opposite runs thereof have been drawn toward each other and are out of engagement with the legs 52 and 53 of the guide 51. The apparatus of the present invention functions as a self-adjusting belt tensioner which compensates for variations in belt length resulting from use. An operator manually pushes the mower unit 13 to advance the same over a grass lawn.

For stopping the rotation of driven shaft 15 of the mower attachment 10, the V-belt 50 is slackened. This is accomplished by shifting the control lever 88 into the position shown by solid line in FIG. 6. By shifting the lever 88 in this manner, the control rod 86 is lowered, thereby pivoting the plate 76 to the position shown in FIG. 3. Consequently, spring 74 is no longer tensioned. When the plate 41 is shifted to its belt-tensioning position, the spring 80 is tensioned by the movement of the bolt 54. When spring 74 is not under tension, the restoring action of spring 80 actuates the bolt 54 to shift the engine support plate 41 in a direction opposite to that shown by arrow 71 (FIG. 2). The shifting of plate 41 moves the engine 42, the drive shaft 43 and the sheave 47 toward the forward end of the mower unit 13 to slacken the drive belt 50. Hence, the rotation of the driven shaft 15 of the mower attachment is stopped.

While the present invention has been described in connection with a mower attachment and a detachable power unit it is to be understood that the inventive concept is equally applicable to other garden and lawn instruments such as a tiller, rotary hoes and the like, and also is equally applicable to gardening implements wherein the power unit is not detachable.

It will be understood that modifications and variations of the embodiments of the invention disclosed herein may be resorted to without departing from the spirit of the invention and the scope of the appended claims.

Having thus described our invention, what we claim as new and desire to protect by Letters Patent is:

1. In a gardening implement, relatively movable plates, a first rotatable shaft supported by one of said plates for movement therewith, a first sheave connected to said shaft for rotation therewith, a drive belt trained around said sheave, a second sheave arranged to be driven by said drive belt, a second shaft carried by another of said plates and connected to said second sheave for rotation therewith, a first spring operatively connected at one end thereof to said one plate, means connected to the other end of said first spring and arranged to tension said first spring for shifting said one plate from a belt slackening position to a belt tensioning position, whereby said first shaft moves with said one plate to tension said belt for driving said second shaft, and a second spring operatively connected between said plates, said second spring being arranged to be tensioned by the shifting of said one plate from the belt slackening position to the belt tensioning position whereby when said first spring yields, said one plate is shifted from the belt tensioning position to the belt slackening position under the action of said second spring, and said first shaft moves with said one plate for slackening said belt to stop the rotation of said second shaft.

2. In a gardening implement, relatively movable plates having openings therein, an engine supported by one of said plates for movement therewith, a drive shaft connected to said engine to be driven thereby and received by said openings, a drive sheave connected to said drive shaft for rotation therewith, a drive belt trained around said drive sheave, a driven sheave arranged to be driven by said drive belt, a driven shaft carried by the other of said plates and connected to said driven sheave for rotation therewith, a first spring operatively connected at one end thereof to said one plate, a pivot plate pivotally supported by the other of said plates and operatively connected to the other end of said first spring, control linkage actuating said pivot plate to tension said first spring for shifting said one plate from a belt slackening position to a belt tensioning position, whereby said drive shaft moves with said one plate to tension said belt for driving said driven shaft, and a second spring operatively connected to said plates, said second spring being arranged to be tensioned by the shifting of said one plate from the belt slackening position to the belt tensioning position, whereby when said pivot plate is moved by said control linkage to permit said first spring to yield, said one plate is shifted from the belt tensioning position to the belt slackening position under the yielding action of said second spring, and said drive shaft moves with said one plate for slackening said belt to stop the rotation of said driven shaft.

3. In a gardening implement, relatively movable plates having openings therein, an engine supported by one of said plates for movement therewith, a drive shaft connected to said engine to be driven thereby and received by said openings, a drive sheave connected to said drive shaft for rotation therewith, a drive belt trained around said drive sheave, a driven sheave arranged to be driven by said drive belt, a driven shaft carried by another of said plates and connected to said driven sheave for rotation therewith, a first spring operatively connected at one end thereof to said one plate, means connected to the other end of said first spring and arranged to tension said first spring for shifting said one plate from a belt slackening position to a belt tensioning position, whereby said drive shaft moves with said one plate to tension said belt for driving said driven shaft, and a second spring operatively connected between said plates, said second spring being arranged to be tensioned by the shifting of said one plate from the belt slackening position to the belt tensioning position, whereby when said first spring yields, said one plate is shifted from a belt tensioning position to a belt slackening position under the action of said second spring, and said drive shaft moves with said one plate for slackening said belt to stop the rotation of said driven shaft.

4. A gardening implement comprising an engine, a vertical drive shaft connected to said engine to be driven thereby, an engine support plate supporting said engine in fixed relation therewith and having an aperture therein for receiving said drive shaft, a frame disposed below said engine support plate and having an opening therein for receiving said drive shaft, said frame including a plurality of slots, means received by each of said slots and secured to said support plate for mounting said support plate for movement relative to said frame, a drive sheave secured to the lower portion of said drive shaft, a vertical driven shaft received by said frame, a driven sheave secured to the upper portion of said driven shaft, a drive belt trained around said sheaves for imparting rotary movement to said driven shaft, a first spring operatively connected at one end thereof to one of said support plate mounting means, means operatively connected to the other end of said first spring and arranged to tension said first spring for shifting said support plate from a belt slackening position to a belt tensioning position, whereby said drive shaft moves with said support plate to tension said belt for driving said driven shaft, and resilient means operatively connected between said frame and said support plate, said resilient means being arranged to be tensioned by the shifting of said support plate from the belt slackening position to the belt tensioning position and when said first spring yields, said support plate is shifted from the belt tensioning position to the belt slackening position under the action of said yieldable means, whereby said drive shaft moves with said support plate for slackening said belt to stop the rotation of said driven shaft.

5. A gardening implement comprising an engine, a vertical drive shaft connected to said engine to be driven thereby, an engine support plate supporting said engine in fixed relation therewith and having an aperture therein for receiving said drive shaft, a frame disposed below said engine support and having an opening therein for receiving said drive shaft, said frame including a plurality of slots, means received by each of said slots and secured to said support plate for mounting said support plate for movement relative to said frame, a drive sheave secured to the lower portion of said drive shaft, a vertical driven shaft received by said frame, a driven sheave secured to the upper portion of said driven shaft, a drive belt trained around said sheaves for imparting rotary movement to said driven shaft, a pivot plate pivotally supported by said frame, a first spring operatively connected to said pivot plate and one of said support plate mounting means, control linkage actuating said pivot plate to tension said first spring for shifting said support plate from a belt slackening position to a belt tensioning position, whereby said drive shaft moves with said support plate to tension said belt for driving said driven shaft, and a second spring operatively connected to said frame and another of said support plate mounting means, said second spring being arranged to be tensioned by the shifting of said support plate from the belt slackening position to the belt tensioning position and when said pivot plate is moved by said control linkage to permit said first spring to yield, said support plate is shifted from the belt tensioning position to the belt slackening position under the yielding action of said second spring, whereby said drive shaft moves with said support plate for slackening said belt to stop the rotation of said driven shaft.

6. A gardening implement comprising an engine, a vertical drive shaft connected to said engine to be driven thereby, an engine support plate supporting said engine in fixed relation therewith and having an aperture therein for receiving said drive shaft, a frame disposed below said engine support plate and having an opening therein for receiving said drive shaft, said frame including a plurality of slots, means received by each of said slots and secured to said support plate for mounting said support plate for movement relative to said frame, a drive sheave secured to the lower portion of said drive shaft, a vertical driven shaft received by said frame, a driven sheave secured to the upper portion of said driven shaft, a drive belt trained around said sheaves for imparting rotary movement to said driven shaft, a first spring operatively connected at one end thereof to one of said support plate mounting means, means connected to the other end of said first spring and arranged to tension said first spring for shifting said support plate from a belt slackening position to a belt tensioning position, whereby said drive shaft moves with said support plate to tension said belt for driving said driven shaft, and a second spring operatively connected to said frame and another of said support plate mounting means, said second spring being arranged to be tensioned by the shifting of said support plate from the belt slackening position to the belt tensioning position and when said first spring yields, said support plate is shifted from the belt tensioning position to the belt slackening position under the yielding action of said second spring, whereby said drive shaft moves with said support plate for slackening said belt to stop the rotation of said driven shaft.

7. In a gardening implement having a frame structure, a driven shaft mounted on said frame structure for rotation about a fixed axis and having a sheave fixed thereto, a rotatable drive shaft having a drive sheave fixed thereto, means mounting said drive shaft on said frame structure for lateral movement in opposite directions relative to said driven shaft, a belt operatively connecting said sheaves, opposed springs connected between said drive shaft mounting means and said frame structure for urging said mounting means and said drive shaft in opposite directions, and means connected to one of said springs and arranged to adjust the force thereof to vary the position of said drive shaft mounting means and the tension of said belt.

8. In a gardening implement having a frame structure, a driven shaft mounted on said frame structure for rotation about a fixed axis and having a sheave fixed thereto, a rotatable drive shaft having a drive sheave fixed thereto, means mounting said drive shaft on said frame structure for lateral movement in opposite directions relative to said driven shaft, a belt operatively connecting said sheaves, opposed springs connected between said drive shaft mounting means and said frame structure for urging said mounting means and said drive shaft in opposite directions, means connected to one of said springs and arranged to adjust the force thereof to vary the position of said drive shaft mounting means and the tension of said belt, and guide means connected to said drive shaft mounting means and having a fixed relation with respect to said drive shaft and engageable with opposite runs of said belt when the same is slack and arranged to retain the drive belt in engagement with the driven sheave when the belt is disengaged from the drive sheave.

9. In a gardening implement having a frame structure composed of connected fixed and movable portions relatively shiftable in opposite directions, the combination of a drive shaft rotatably mounted on one of said frame portions and a driven shaft rotatably mounted on the other frame portion, each of said shafts having a sheave fixed thereon, a belt operatively connecting said sheaves for driving said driven shaft, first and second springs connected between said fixed and movable frame portions respectively for effecting lateral movement of one of said shafts towards and away from the other, means connected to one of said springs for adjusting the force of the same to vary the tension of said belt, and guide means movable with one of said shafts and engageable with opposite runs of said belt when the same is slack and arranged to retain the belt in engagement with the sheave on the other shaft when the belt is disengaged by the sheave on said one shaft.

10. In a gardening implement having a frame structure composed of connected fixed and movable portions relatively shiftable in opposite directions, the combination of a drive shaft rotatably mounted on one of said frame portions and a driven shaft rotatably mounted on the other frame portion, each of said shafts having a sheave fixed thereon, a belt operatively connecting said sheaves for driving said driven shaft, first and second springs connected between said fixed and movable frame portions respectively for effecting lateral movement of one of said shafts towards and away from the other, and means connected to one of said springs for adjusting the force of the same to vary the tension of said belt.

References Cited in the file of this patent

UNITED STATES PATENTS

| | | |
|---|---|---|
| 1,271,717 | Kaufmann | July 9, 1918 |
| 1,629,918 | Kastler | May 24, 1927 |
| 2,292,580 | Moyer et al. | Aug. 11, 1942 |
| 2,395,625 | Heyer | Feb. 26, 1946 |
| 2,594,674 | Nietfeld | Apr. 29, 1952 |
| 2,737,823 | Smallegan | Mar. 13, 1956 |
| 2,742,750 | Funk | Apr. 24, 1956 |

FOREIGN PATENTS

| | | |
|---|---|---|
| 29,458 | France | May 5, 1925 |
| 807,061 | France | Oct. 5, 1936 |